United States Patent Office 3,257,392
Patented June 21, 1966

3,257,392
CARDENOLIDE-, DIHYDROCARDENOLIDE-, BUFADIENOLIDE- AND TETRAHYDROBUFADIENOLIDE - GUANYLHYDRAZONES, THEIR PRODUCTION AND USE
Karl-Heinz Meyer, Siegismund Schütz, and Kurt Stoepel, Wuppertal-Elberfeld, and Hans-Günther Kroneberg, Haan, Rhineland, Germany, assignors to Farbenfabriken Bayer Aktiengesellschaft, Leverkusen, Germany, a corporation of Germany
No Drawing. Filed Apr. 7, 1964, Ser. No. 358,060
Claims priority, application Germany, Apr. 10, 1963, F 39,451
10 Claims. (Cl. 260—239.57)

The present invention relates to novel guanylhydrazones of cardenolides, dihydrocardenolides, bufadienolides and tetrahydrobufadienolides, their production, and pharmaceutical compositions and methods of administration for the treatment of cardiac conditions, which new guanylhydrazones have enhanced solubility characteristics and digitoxin- or strophanthin-like action, i.e. are cardiotonics.

In accordance with the present invention, it has been found that therapeutically valuable compounds having beneficial cardiotonic activity are obtained when cardenolides, dihydrocardenolides, bufadienolides and tetrahydrobufadienolides containing one or more keto or aldehyde carbonyl groups are transformed or converted into the corresponding substituted and unsubstituted guanylhydrazones which may still contain one or more free keto or aldehyde carbonyl groups.

The new guanylhydrazones of the present invention are therapeutically active as such or in the form of their therapeutically acceptable salts with non-toxic organic and inorganic acids. Both the guanylhydrazones and their salts act beneficially on the heart with a digitoxin- or strophantin-like action and are therefore good cardiotonics. As compared with the starting compounds, they have enhanced solubility. Suitable organic and inorganic acids are acetic, propionic, lactic, maleic, fumaric, succinic, tartaric, citric, salicylic, naphthalene-1,5-disulfonic, phosphoric, hydrochloric, etc. acids.

The novel guanylhydrazones, either as such or in the form of their salts, are placed in suitable dosage form with a pharmaceutical carrier or vehicle containing a therapeutically effective amount of such guanylhydrazone or salt and the resulting compositions are administered to patients in need thereof for treating cardiac conditions where a cardiotonic is indicated or prescribed and where a digitoxin- or strophanthin-like action is desired.

The new compounds are produced from cardenolides, dihydrocardenolides, bufadienolides and tetrahydrobufadienolides which contain one or more keto or aldehyde carbonyl groups, by one of the following procedures:

(a) By reaction with an aminoguanidine of the formula

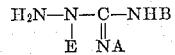

or a salt thereof, in a manner per se known;

(b) By condensation with a thiosemicarbazide of the formula

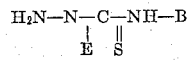

and reacting the condensation product with an amine of the formula

or, alternatively, by first converting in a manner per se known into an S-alkyl-isothiosemicarbazone and then reacting with the amine of the formula

H₂NA (c) By reaction with an S-alkyl-isothiosemicarbazide of the formula

and then allowing an amine of the formula

H₂N—B to act on the reaction product; or (d) By condensation with a hydrazine of the formula

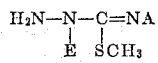

followed by reaction with a cyanamide of the formula

NCHN—B or an S-alkyl-isothiourea of the formula

In the above formulas A and E are each hydrogen or a branched or unbranched or alicyclic alkyl group with 1 to 6 carbon atoms, B is hydrogen, an alkyl chain with 1 to 6 carbon atoms, which may also be linked with A, optionally via a hetero atom, such as N, O or S, a nitro or an amino group or a basic radical of the formula

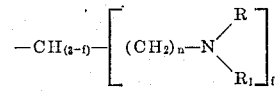

wherein $n$ is 0 to 8 and $f$ is 1 or 2. R and $R_1$ are each hydrogen, or the same or different branched or unbranched or alicyclic alkyl groups of 1 to 6 carbon atoms which may further be linked with one another, optionally via a heteroatom such as N, S or O.

Strophanthidin, strophanthidonic acid esters, anhydrostrophanthidonic acid esters, digitoxigenone, gitoxigenone, dihydrogitoxigenone, digoxigenone, anhydrodigoxigenone, oleandrigenone, anhydro-oleandrigenone, adynerigenone, uzarigenone, anhydro-uzarigenone, adonitoxigenin, dihydro-ouabagenone, sarmentogenone, sinogenin, caudogenone, dihydro-strophanthidin, dihydro-digitoxigenone, dihydro-digoxigenone, dihydro-oleandrigenone, tetrahydrobufotalone, sarmutogenone, sarverogenin, sarberogenone, corotoxigenin, hellebrigenin, bufotalone, the aglycones of scilliglaucoside, bovoside, bovoruboside, scillirosidone, etc. are all suitable starting materials for the production of the new guanylhydrazones.

The invention is illustrated by the following non-limitative examples.

*Example 1*

1 gram of 1-(β-diethyl-aminoethyl)-3-amino-guanidine dihydrochloride is dissolved under nitrogen in 25 ml. of methanol. A solution of 1.2 g. of digitoxigenone in 25 ml. of methanol is added and allowed to stand for three days at room temperature. It is then poured into ether and the flakes which precipitate are filtered off with suction and boiled with acetone. The product is recrystallized from ethanol/ether.

Yield: 1 gram of 3-[1-(β-diethyl-aminoethyl)-guanylhydrazone] dihydrochloride of digitoxigenone of M.P. 163° C. to 165° C. (decomposition).

In analogous manner there have been produced:

Example 2

The 3-guanylhydrazone hydrochloride of digitoxigenone of M.P. 242° C. (decomposition).

Example 3

The 3,16-bis-guanylhydrazone dihydrochloride of gitoxigenone of M.P. 253° C. to 256° C. (decomposition).

Example 4

The 19-guanylhydrazone hydrochloride of strophanthidin of M.P. 232° C. to 234° C. (decomposition).

Example 5

0.5 gram of aminoguanidine hydrogen carbonate is dissolved in methanolic hydrochloric acid until a pH value of 2 is indicated. A solution of 0.6 g. digoxigenone in 30 ml. of methanol is added and allowed to stand for three days at room temperature under nitrogen. The reaction solution is then stirred into 0.5 liter of ether and the precipitated crystals are filtered off with suction and boiled with acetone and alcohol.

Yield: 0.7 gram of 3-guanylhydrazone hydrochloride of 14-anhydro-digoxigenone of M.P. 277° C. (decomposition).

What is claimed is:

1. A guanylhydrazone of a cardenolide having at least one keto or aldehyde moiety and therapeutically acceptable salts thereof with non-toxic organic and inorganic acids.

2. A guanylhydrazone of a dihydrocardenolide having at least one keto or aldehyde moiety and therapeutically acceptable salts thereof with non-toxic organic and inorganic acids.

3. A compound selected from the group consisting of the 3-[1-($\beta$-diethyl-aminoethyl)-guanylhydrazone] dihydrochloride of digitoxigenone, the 3-guanylhydrazone hydrochloride of digitoxigenone, the 3,16-bis-guanylhydrazone dihydrochloride of gitoxigenone, the 19-guanylhydrazone hydrochloride of strophanthidin and the 3-guanylhydrazone hydrochloride of 14-anhydrodigoxigenone.

4. The 3-[1-($\beta$-diethyl-aminoethyl)-guanylhydrazone] dihydrochloride of digitoxigenone.

5. The 3-guanylhydrazone hydrochloride of digitoxigenone.

6. The 3,16-bis-guanylhydrazone dihydrochloride of gitoxigenone.

7. The 19-guanylhydrazone hydrochloride of strophanthidin.

8. The 3-guanylhydrazone hydrochloride of 14-anhydrodigoxigenone.

9. A process for producing the 3-[1-($\beta$-diethylaminoethyl)-guanylhydrazone] dihydrochloride of digitoxigenone which comprises reacting 1-($\beta$-diethyl-aminoethyl)-3-aminoguanidine dihydrochloride with digitoxigenone.

10. A process for producing the 3-guanylhydrazone hydrochloride of 14-anhydro-digoxigenone which comprises reacting aminoguanidine hydrogen carbonate dissolved in methanolic hydrochloric acid with digoxigenone.

No references cited.

LEWIS GOTTS, *Primary Examiner.*

HENRY A. FRENCH, *Assistant Examiner.*